United States Patent [19]

Kitahara et al.

[11] Patent Number: 4,525,541
[45] Date of Patent: Jun. 25, 1985

[54] METHOD FOR MODIFYING RUBBERS

[75] Inventors: Shizuo Kitahara, Kawaguchi; Nagatoshi Sugi, Yokohama, both of Japan

[73] Assignee: Nippon Zeon Co. Ltd., Tokyo, Japan

[21] Appl. No.: 506,875

[22] Filed: Jun. 22, 1983

[30] Foreign Application Priority Data

Jun. 29, 1982 [JP] Japan .................................. 57-112145
Mar. 7, 1983 [JP] Japan .................................. 58-37159

[51] Int. Cl.$^3$ ................................................ C08F 8/32
[52] U.S. Cl. ................................. 525/337; 525/337.8; 525/337.9; 525/333.1; 525/333.2; 525/371; 525/377; 525/379; 525/386
[58] Field of Search ............... 525/377, 379, 386, 337, 525/371

[56] References Cited

U.S. PATENT DOCUMENTS

| | | | |
|---|---|---|---|
| 3,478,004 | 11/1969 | Kehr et al. | 525/386 |
| 3,652,520 | 3/1972 | Ryan et al. | 525/386 |
| 3,803,087 | 4/1974 | Vaughn | 525/386 |
| 3,972,867 | 8/1976 | Dawans et al. | 525/386 |
| 4,144,226 | 3/1979 | Crutchfield et al. | 528/232 |
| 4,173,552 | 11/1979 | Kuceski et al. | 525/386 |
| 4,228,254 | 10/1980 | Powers et al. | 525/386 |
| 4,284,541 | 8/1981 | Takeda et al. | 525/386 |

FOREIGN PATENT DOCUMENTS 0020000 10/1980 European Pat. Off. .

Primary Examiner—Bernard Lipman
Attorney, Agent, or Firm—Sherman & Shalloway

[57] ABSTRACT

A method for modifying a rubber having an unsaturated carbon bond which comprises reacting the rubber with an organic compound represented by the general formula

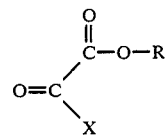

wherein —R represents a hydrocarbon group, and —X is —H, —CN or

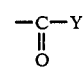

in which —Y represents an organic atomic grouping, in the presence of a Lewis acid to introduce an ester group. Optionally, the ester group introduced is converted into a carboxyl group by chemically treating the reaction product.

28 Claims, No Drawings

METHOD FOR MODIFYING RUBBERS

This invention relates to a method for modifying rubbers having an unsaturated carbon bond.

Methods have previously been known to introduce a polar group such as a carboxyl group into rubbers, for example to add maleic anhydride or glyoxal to rubber, in order to improve the properties of rubbers in the unvulcanized and vulcanized states, such as green strength and adhesion. Many of these methods, however, have the defect that since side-reactions such as gellation of rubbers or the decrease of their molecular weight are liable to take place during the addition-reaction, the strength properties of the vulcanized products are reduced, or the rate of the reaction is slow.

It is an object of this invention to provide a method for modifying rubbers which is free from this defect.

The object of this invention is achieved by a method which comprises reacting a rubber having an unsaturated carbon bond with an organic compound represented by the general formula

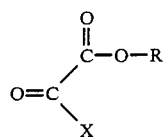

wherein —R represents a hydrocarbon group, and —X represents —H, —CN or

in which Y represents an organic atomic grouping, in the presence of a Lewis acid to introduce an ester group.

Examples of the rubber having an unsaturated carbon bond include homopolymers of conjugated dienes such as butadiene, isoprene, piperylene, 2,3-dimethylbutadiene and chloroprene; copolymers of two or more of such conjugated dienes; copolymers of such conjugated dienes with other monomers; ring-opened polymers of cycloolefins such as cyclopentene and norbornene; polymers of dienes such as ethylidenenorbornene and cyclopentadiene; and copolymers of the aforesaid dienes with olefins. Specific examples are natural rubber, guayule gum, polyisoprene rubber, polybutadiene rubber, styrene-butadiene copolymer rubber, butadiene-isoprene copolymer rubber, isoprene-styrene copolymer rubber, butadiene-isoprene-styrene copolymer rubber, butadiene-piperylene copolymer rubber, butadiene-propylene alternate copolymer rubber, polypentenamer, ethylene-propylene-diene copolymer rubbers, butyl rubber, butadiene-acrylonitrile copolymer rubber, butadiene-isoprene-acrylonitrile copolymer rubber, polychloroprene rubber, styrene-butadiene-styrene block copolymer rubber, and styrene-isoprene-styrene block copolymer rubber.

Typical examples of the organic compound represented by the general formula

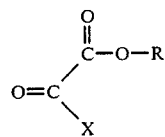

are those of the above formula in which —R represents an aliphatic, alicyclic or aromatic group, provided that when —X is

—Y represents —R$_1$, —OR$_2$ or —NR$_3$R$_4$ in which —R$_1$, —R$_2$, —R$_3$ and —R$_4$ are hydrocarbon groups, particularly aliphatic, alicyclic or aromatic hydrocarbon groups.

More specifically, examples of the organic compound of the above formula in which —X is —H are esters of glyoxylic acid such as methyl glyoxylate, ethyl glyoxylate, isopropyl glyoxylate, tertiary butyl glyoxylate, benzyl glyoxylate, phenyl glyoxylate, octyl glyoxylate and stearyl glyoxylate. Examples of the organic compound of the above formula in which —X is —CN are esters of oxocyanoacetic acid such as methyl oxocyanoacetate, ethyl oxocyanoacetate and tertiary butyl oxocyanoacetate. Examples of the organic compound of the above formula in which —X is

are esters of oxoacylacetic acids of the formula

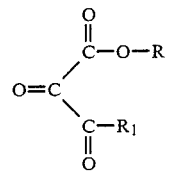

such as methyl oxoacetoacetate, butyl oxoacetoacetate, methyl oxobenzoylacetate and butyl oxobenzoylacetate; esters of oxomalonic acid of the formula

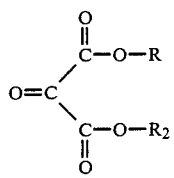

such as dimethyl oxomalonate, diethyl oxomalonate, diisopropyl oxomalonate, di-tertiary butyl oxomalonate and dibenzyl oxomalonate; and esters of 2,3-dioxo-3-(dialkylamino)propionic acids of the formula

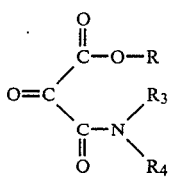

such as ethyl 2,3-dioxo-3-(dimethylamino)propionate and methyl 2,3-dioxo-3-(diethylamino)propionate.

The amount of the organic compound used is not particularly limited. Usually, its amount is 0.0001 to 20 parts by weight, preferably 0.01 to 5 parts by weight, per 100 parts by weight of the unsaturated rubber.

The Lewis acid used in this invention may be those which are generally known. Typical examples are halides, salts, etc. of metals or semi-metals, organic halides and complexes, for example halides of elements such as Be, B, Al, Bi, P, S, Ti, V, Fe, Zn, Ga, Ge, As, Se, Zr, Nb, Mo, Cd, Sn, Sb, Te, Ta, W, Hg, Bi and U, or oxygen-element combinations such as PO, SeO, SO, $SO_2$ and VO. Specific examples include $BF_3$, $BF_3O(C_2H_5)_2$, $(CH_3)_2BF$, $BCl_3$, $AlCl_3$, $AlBr_3$, $(C_2H_5)AlCl_2$, $POCl_3$, $TiCl_4$, $VCl_4$, $MoCl_6$, $SnCl_4$, $(CH_3)SnCl_3$, $SbCl_5$, $TeCl_4$, $TeBr_4$, $FeCl_3$, $WCl_6$ and $(CF_3COO)_2Hg$. Among them, $SnCl_4$, $BF_3O(C_2H_5)_2$, $FeCl_3$ and $TiCl_4$ are preferred because they lead to a high rate of reaction and reduced side-reactions such as gellation of rubber.

The amount of the Lewis acid used is not particularly limited. Usually, its amount is 0.01 to 5 moles, preferably 0.05 to 2 moles, per mole of the organic compound.

The reaction in accordance with this invention is carried out usually in a suitable solvent, or in the absence of a solvent in a kneader. Industrially, the reaction is advantageously carried out in the rubber cement after the polymerization. Examples of the solvent that may be used include aromatic solvents such as benzene and toluene, paraffinic solvents such as butane and hexane, and halogenated hydrocarbon solvents such as chloroform and dichloroethane. Suitable solvents are those which are inert to the reaction and dissolve the rubber.

The organic solvent may be added to the reaction system all at a time in the early stage of the reaction. Or it may be added portionwise or continuously during the reaction. The Lewis acid and the organic compound may be added simultaneously or separately. Or a mixture of these may be added. During the reaction, it is necessary to maintain the reaction system in an anhydrous condition or the water content of the reaction system should be maintained at a restricted value. The reaction temperature is not particularly limited. Usually, it is $-20°$ C. to $100°$ C., preferably $-10°$ C. to $60°$ C. The reaction time is neither restricted in particular, and may range from 10 seconds to 10 hours as the case may be.

In the present invention, the unsaturated rubber reacted as above may be hydrolyzed with acids, alkalies, etc. or reacted with a radical generator such as cerium ammonium nitrate or sodium periodate to convert a part or the whole of the ester group introduced into the unsaturated rubber to a carboxyl group. When an oxomalonate group is introduced into the unsaturated rubber, the reaction with the radical generator is preferred to the hydrolysis. This secondary reaction may also be carried out in solution or in a kneader.

When the reaction in this invention is carried out in a solvent, the reaction can be stopped, and the rubber can be coagulated, by pouring the reaction solution into a large amount of an alcohol or hot water with stirring. As required, the coagulated rubber is then washed to remove organic materials. Subsequent drying gives a modified rubber.

An unvulcanized compound obtained by mixing the resulting modified rubber with conventional rubber chemicals such as a reinforcing agent, a filler, a vulcanizer, a vulcanization accelerator, a vulcanization aid, a softening agent, a tackifier or an antioxidant exhibit excellent green strength. Vulcanized products of the compound have excellent strength properties such as tear strength. An unvulcanized compound of the modified rubber in which the ester group has been partly or wholly converted to a carboxyl group by the method described above is characterized by having higher green strength.

The kind of the reinforcing agent to be blended with the modified rubber is not particularly limited. Examples of preferred reinforcing agents include carbon blacks having an average particle diameter of 10 m$\mu$ to 500 m$\mu$, for example channel blacks abbreviated as EPC, MPC, HPC, CC, etc., furnace blacks abbreviated as SAF, ISAF, HAF, MAF, FEF, HMF, SRF, SPF, GPF, APP, FF, CF, etc., thermal blacks abbreviated as FT, MT, etc., and acetylene black; and silica-type reinforcing agents having an average particle diameter of 10 m$\mu$ to 100 m$\mu$ such as silicic anhydride obtained by the dry method, hydrous silicic acid obtained by the wet method, and synthetic silicate salts.

Calcium carbonate, clay and talc may be used as the filler.

The amount of the reinforcing agent and/or the filler to be blended is usually 1 to 200 parts by weight, preferably 10 to 120 parts by weight, per 100 parts by weight of the modified rubber, selected depending upon the end use of the final product.

Sulfur and sulfur donors of the thiuram and thiazole series are typical vulcanizers. As required, peroxides, polyamines, metal oxides, urethane vulcanizers and resin vulcanizers may be used. Examples of the vulcanization accelerator may be those of the sulfenamide, thiuram, thiazole, guanidine, mercaptotriazine, and aldehyde-amine series. Examples of the vulcanization aid are carboxylic acids such as stearic acid and oleic acid, and metal compounds such as zinc stearate, zinc oxide, magnesium oxide, calcium hydroxide and lead carbonate. Paraffinic, naphthenic and aromatic process oils may be used as the softening agent. Examples of the tackifier are rosin, petroleum hydrocarbon resins, coumarone resins and phenol-terpenene resins. Amines and phenols may be used as the antioxidant. The above-exemplified vulcanization accelerators and aids are used mainly for vulcanization with sulfur or sulfur donors.

The modified rubber obtained by the method of this invention may be blended in any desired proportion with other rubbers such as natural rubber, styrenebutadiene copolymer rubber, polybutadiene rubber, and unmodified polyisoprene rubber.

The method of mixing the individual ingredients is not particularly limited, and usually, various types of rubber kneading machines are used. The carbon black and the process oil may be mixed with rubber in the step of producing the starting rubber or in the step of modifying the rubber to form a carbon master batch and an oil master batch.

Since a compound of the modified rubber obtained by the method of this invention has excellent green strength in the unvulcanized state and excellent dynamic properties such as tear strength, fatigue resistance and rebound after vulcanization, it is useful as the carcasses, treads, side walls, bead fillers and inner liners of vehicle tires, particularly large-sized tires for tracks and buses, various antivibratory rubbers, industrial belts and hoses.

The modified rubber obtained by the method of this invention may also be formed into a latex and used in ordinary applications of latices.

The following examples illustrate the present invention specifically.

Analysis of the modified rubber, preparation of the unvulcanized compound and the vulcanized product of the modified rubber, and testing of the properties of these materials in the examples were carried out by the following methods.

Ester group content of the rubber

The modified rubber from which the remaining low-molecular-weight components were removed was subjected to infrared absorption spectrometry. The content of the ester group introduced into the rubber was determined from the ratio between the absorption at 1720-1735 cm$^{-1}$ due to the C=O stretching vibration of the ester and the absorption at 1660 cm$^{-1}$ due to the C=O stretching vibration of the rubber.

Carboxyl group content of the rubber

After the low-molecular-weight components were removed from the rubber, its carboxyl group content was measured by a neutralization titration method.

Amount of gel

About 0.2 g of small pieces of a rubber sample were put in a square cage made of an 80-mesh wire gauze and measuring 3 cm at each side, and immersed for 24 hours in toluene. The amount (%) of a gel was determined from the dry weight of the rubber remaining in the cage. A gel content of 2% or below is considered to represent substantially no gellation.

Preparation of an unvulcanized compound of rubber

The modified rubber was kneaded with the various compounding chemicals in the following recipe excepting sulfur and the vulcanization accelerator in a small-sized Banbury mixer. Sulfur and the vulcanization accelerator were added to the resulting mixture on a small roll and kneaded to prepare an unvulcanized rubber compound.

Compounding recipe:

| Rubber | 150 (parts by weight) |
|---|---|
| HAF carbon | 50 |
| Aromatic process oil | 5 |
| Zinc oxide | 5 |
| Stearic acid | 2 |
| Sulfur | 2.5 |
| N—oxydiethylene-2-benzothiazyl sulfenamide (vulcanization accelerator) | 0.8 |
| N—isopropyl-N'—phenyl-p-phenylenediamine | 1.0 |

Wallace plasticity

The plasticity of rubber or an unvulcanized rubber compound was measured at 100° C. by a Wallace's rapid plastometer.

Green strength

The unvulcanized rubber compound was press-formed at 100° C. for 5 minutes to form an unvulcanized rubber sheet having a thickness of 2 mm. A dumbbell-shaped JIS No. 3 test specimen was punched out from the sheet. The test specimen was subjected to a tensile test at 25° C. at a tensile speed of 500 mm/min., and its tensile stress at 500% stretch was determined and defined as the green strength.

Vulcanization speed

This is represented by the time ($T_{95}$) which elapsed until the torque measured at 145° C. by an oscillating disc rheometer reached 95% of the maximum torque.

Tensile test

An unvulcanized rubber compound was press-cured at 145° C. for a predetermined period of time to form a 2 mm-thick sheet, and a Dumbell-shaped No. 3 test specimen stipulated in JIS-K6301 was punched out. The test specimen was subjected to a tensile test at a tensile speed of 500 mm/min. at 25° C.

Tear strength

Six rectangular test specimens, each 15 mm wide and 100 mm long, were punched out from a 2 mm-thick vulcanized sheet. Three of the test specimens had a longitudinal direction corresponding with the grain direction, and the remaining three had a widthwise direction corresponding with the grain direction. In each test specimen, a cut, 6 mm long, was formed centrally in one longitudinal side edge at right angles thereto by a safety razor blade. The tear strengths of the test specimens were measured at a tensile speed of 500 mm/min. at 25° C., and the average of the six strength values was calculated.

EXAMPLE 1

One hundred and sixty grams of polyisoprene rubber having a cis-1,4 linkage content of 98% (sample A) was dissolved in 4 liters of dehydrated n-hexane, and in a sealed glass vessel (separable flask), ethyl glyoxylate and SnCl$_4$ were added in the amounts indicated in Table 1 to the solution at 25° C. in an atmosphere of nitrogen, and the mixture was reacted for 60 minutes. One hundred milliliters of methanol was poured into the reaction mixture (whereby it was presumed the addition-reaction was stopped). Thereafter, the reaction mixture was poured into acetone to coagulate the rubber completely. The coagulated product was cut to pieces and washed. The small pieces of the rubber were then immersed in 3 liters of acetone containing about 2 g of 2,6-ditertiary butyl-4-methylphenol (antioxidant) and then dried for one day in a vacuum dryer. Thus, samples B, C, D and E shown in Table 1 were obtained.

It is seen that samples D and E in accordance with this invention were modified (introduction of the ester group) without substantial gellation and molecular weight reduction (change in the Wallace plasticity).

TABLE 1

| Sample | Ethyl glyoxylate (g) | SnCl$_4$ (g) | Ester group introduced into rubber (moles/100 g of rubber) | Wallace plasticity | Amount of gel (%) |
|---|---|---|---|---|---|
| Comparison | | | | | |

TABLE 1-continued

| Sample | Ethyl glyoxylate (g) | SnCl$_4$ (g) | Ester group introduced into rubber (moles/100 g of rubber) | Wallace plasticity | Amount of gel (%) |
| --- | --- | --- | --- | --- | --- |
| A | — | — | — | 46 | 0.6* |
| B | 1.2 | 0 | 0 | 48 | 0.2 |
| C | 0 | 3.12 | 0 | 49 | 0.4 |
| Invention | | | | | |
| D | 1.2 | 3.12 | 0.0059 | 49 | 0.4 |
| E | 2.4 | 6.25 | 0.0120 | 49 | 0.5 |

*This value was obtained with a rubber prepared by performing the same operation as in the preparation of the other samples except that ethyl glyoxylate and SnCl$_4$ were not added to sample A, and is not the amount of gel originally contained in sample A (the gel which was originally contained in Sample A mostly disappeared when sample A was dissolved in n-hexane).

The properties of unvulcanized compounds of the samples indicated in Table 1 and their vulcanization products were measured, and the results are shown in Table 2.

TABLE 2

| | Properties of the unvulcanized compound | | | Properties of the vulcanized product | | | | |
| --- | --- | --- | --- | --- | --- | --- | --- | --- |
| | | | | Cure time (min.) | Tensile test | | | |
| | | | | | 300% | | | |
| Sample | Wallace plasticity | Green strength (kg/cm$^2$) | Vulcanization speed T$_{95}$ (minutes) | | Tensile stress (kg/cm$^2$) | Tensile strength (kg/cm$^2$) | Elongation (%) | Tear strength (kg/cm) |
| Comparison | | | | | | | | |
| A | 46 | 1.9 | 17 | 22 | 136 | 289 | 560 | 35 |
| B | 47 | 1.9 | 17 | 22 | 137 | 284 | 550 | 32 |
| C | 46 | 2.0 | 18 | 23 | 132 | 281 | 560 | 38 |
| Invention | | | | | | | | |
| D | 46 | 3.0 | 17 | 22 | 146 | 293 | 560 | 54 |
| E | 43 | 3.3 | 17 | 22 | 140 | 288 | 540 | 46 |

It is seen from Table 2 that the samples D and E in accordance with this invention have excellent green strength and tear strength.

EXAMPLE 2

The same polyisoprene rubber as used in Example 1 (160 g) was dissolved in 3 liters of dehydrated toluene, and in a sealed glass vessel (separable flask), tertiary butyl glyoxylate and SnCl$_4$ were added in the amounts indicated in Table 3 to the solution at 25° C. in an atmosphere of nitrogen. The mixture was reacted for 30 minutes, and then 50 ml of methanol was poured into the reaction mixture (whereby it was presumed the addition-reaction was stopped). Then, the reaction mixture was poured into 3 liters of methanol to coagulate the rubber completely. The coagulated product was cut to small pieces and washed. The small rubber pieces were then immersed in 3 liters of methanol containing about 2 g of 2,6-ditertiary butyl-4-methylphenol (antioxidant), washed, and dried for a day in a vacuum dryer. Thus, samples F and G were obtained.

TABLE 3

| Sample | t-Butyl glyoxylate (g) | SnCl$_4$ (g) | Ester group introduced into rubber (moles/100 g of rubber) | Wallace plasticity | Amount of gel (%) |
| --- | --- | --- | --- | --- | --- |
| F | 0.76 | 1.52 | 0.0032 | 48 | 0.6 |
| G | 1.53 | 3.04 | 0.0060 | 46 | 0.3 |

Unvulcanized compounds of samples F and G and their vulcanization products were measured, and the results are shown in Table 4.

TABLE 4

| | Properties of the unvulcanized compound | | | Properties of the vulcanized product | | | | |
| --- | --- | --- | --- | --- | --- | --- | --- | --- |
| | | | | Cure time (min.) | Tensile test | | | |
| | | | | | 300% | | | |
| Sample | Wallace plasticity | Green strength (kg/cm$^2$) | Vulcanization speed T$_{95}$ (minutes) | | Tensile stress (kg/cm$^2$) | Tensile strength (kg/cm$^2$) | Elongation (%) | Tear strength (kg/cm) |
| F | 38 | 4.0 | 16 | 22 | 146 | 298 | 510 | 58 |
| G | 40 | 4.3 | 17 | 22 | 157 | 295 | 480 | 50 |

EXAMPLE 3

The same polyisoprene rubber as used in Example 1 (160 g) was dissolved in 3 liters of dehydrated benzene, and in a sealed glass vessel (separable flask), tertiary butyl glyoxylate and SnCl$_4$ were added in the amounts indicated in Table 5 to the solution at 25° C. in an atmosphere of nitrogen. The mixture was reacted for 30 minutes and then 100 ml of methanol was poured into the reaction mixture (whereby it was presumed the addition-reaction was stopped). Then, an aqueous solution of HCl was added in each of the amounts indicated in Table 5, and the mixture was stirred for 1 hour.

The reaction mixture was then poured into 3 liters of methanol to coagulate the rubber completely. The coagulated product was cut to small pieces and washed. The small rubber pieces were immersed in 3 liters of methanol containing about 2 g of 2,6-ditertiary butyl-4-methylphenol (antioxidant), washed, and dried for a day in a vacuum dryer to obtain samples H and I shown in Table 5.

TABLE 5

| Sample | t-Butyl glyoxylate (g) | SnCl$_4$ (g) | Aqueous solution of HCl (10%) (g) | Carboxyl group introduced into rubber (moles/100 g of rubber) | Wallace plasticity |
| --- | --- | --- | --- | --- | --- |
| H | 0.75 | 1.52 | 4.2 | 0.0016 | 45 |

TABLE 5-continued

| Sample | t-Butyl glyoxylate (g) | SnCl$_4$ (g) | Aqueous solution of HCl (10%) (g) | Carboxyl group introduced into rubber (moles/100 g of rubber) | Wallace plasticity |
|---|---|---|---|---|---|
| I | 1.50 | 3.04 | 8.5 | 0.0033 | 43 |

The properties of unvulcanized compounds of samples H and I and their vulcanization products were measured, and the results are shown in Table 6.

TABLE 6

| | Properties of the unvulcanized compound | | | Properties of the vulcanized product | | | | |
|---|---|---|---|---|---|---|---|---|
| | | | | | Tensile test | | | |
| | | | | | 300% | | | |
| Sample | Wallace plasticity | Green strength (kg/cm$^2$) | Vulcanization speed T$_{95}$ (minutes) | Cure time (min.) | Tensile stress (kg/cm$^2$) | Tensile strength (kg/cm$^2$) | Elongation (%) | Tear strength (kg/cm) |
| H | 39 | 15.1 | 16 | 22 | 144 | 291 | 500 | 51 |
| I | 41 | 26.0 | 16 | 22 | 140 | 273 | 460 | 53 |

It is seen from Table 6 that the green strengths of these samples H and I are higher than those of the samples shown in Table 4.

EXAMPLE 4

Polyisoprene rubber was modified in the same way as in Example 3 except that benzyl glyoxylate was used as the glyoxylate, and BF$_3$O(C$_2$H$_5$)$_2$ (an ethyl ether complex of BF$_3$) was used as the Lewis acid, in the amounts indicated in Table 7.

Sample J shown in Table 7 was obtained.

TABLE 7

| Sample | Benzyl glyoxylate (g) | BF$_3$O(C$_2$H$_5$)$_2$ (g) | Ester group introduced into rubber (moles/100 g of rubber) | Wallace plasticity | Amount of gel (%) |
|---|---|---|---|---|---|
| J | 1.64 | 0.75 | 0.0030 | 46 | 0.8 |

The properties of an unvulcanized compound of sample J and its vulcanization product were measured, and the results are shown in Table 8.

TABLE 8

| | Properties of the unvulcanized compound | | | Properties of the vulcanized product | | | | |
|---|---|---|---|---|---|---|---|---|
| | | | | | Tensile test | | | |
| | | | | | 300% | | | |
| Sample | Wallace plasticity | Green strength (kg/cm$^2$) | Vulcanization speed T$_{95}$ (minutes) | Cure time (min.) | Tensile stress (kg/cm$^2$) | Tensile strength (kg/cm$^2$) | Elongation (%) | Tear strength (kg/cm) |
| J | 40 | 28 | 16 | 22 | 145 | 283 | 470 | 50 |

EXAMPLE 5

Fifty grams of each of the unsaturated rubbers shown in Table 9 (polyisoprene rubber having a cis-1,4 linkage content of 98%, polybutadiene rubber having a cis-1,4 linkage content of 98%, and polybutadiene rubber having a vinyl linkage content of 70) was dissolved in 1 liter of dehydrated toluene, and in a sealed glass vessel (separable flask), each of the glyoxylate esters and each of the Lewis acids shown in Table 9 were added to the solution at 25° C. in an atmosphere of nitrogen. The mixture was reacted for 30 minutes, and then 30 ml of methanol was poured into the reaction mixture. Then, the reaction mixture was poured into 1 liter of methanol to coagulate the rubber completely. The coagulated products were cut to small pieces, and washed. Then, the small rubber pieces were immersed in 1 liter of methanol containing about 1 g of 2,6-ditertiary butyl-4-methylphenol (antioxidant), washed, and then dried for a day in a vacuum dryer to obtain samples K to O, Q to S, U and V shown in Table 9.

Samples K to O, Q to S, U and V in accordance with this invention were modified without substantial gellation or molecular weight reduction. It is seen that the method of this invention is an excellent method of modifying unsaturated rubbers.

TABLE 9

| Sample | Unsaturated rubber | Glyoxylate ester | Lewis acid | Ester group introduced into rubber (moles/100 g of rubber) | Wallace plasticity | Amount of gel (%) |
|---|---|---|---|---|---|---|
| A | Polyisoprene rubber having a cis-1,4 linkage content of 98% | — | — | — | 46 | 0.6* |
| K | Polyisoprene rubber having a cis-1,4 linkage content of 98% | Ethyl glyoxlate 1.02 g | BF$_3$O(C$_2$H$_5$)$_2$ 0.75 g | 0.0032 | 49 | 0.5 |
| L | Polyisoprene rubber having a cis-1,4 linkage content of 98% | Benzyl glyoxylate 0.16 g | SnCl$_4$ 0.08 g | 0.0003 | 47 | 0.3 |
| M | Polyisoprene rubber having | Methyl glyoxylate 0.88 g | TiCl$_4$ 1.90 g | 0.0029 | 53 | 1.0 |

TABLE 9-continued

| Sample | Unsaturated rubber | Glyoxylate ester | Lewis acid | Ester group introduced into rubber (moles/100 g of rubber) | Wallace plasticity | Amount of gel (%) |
|---|---|---|---|---|---|---|
| | a cis-1,4 linkage content of 98% | | | | | |
| N | Polyisoprene rubber having a cis-1,4 linkage content of 98% | Benzyl glyoxylate 0.82 g | EtAlCl$_2$ 0.31 g | 0.0015 | 55 | 2.0 |
| O | Polyisoprene rubber having a cis-1,4 linkage content of 98% | Butyl glyoxylate 0.65 g | FeCl$_3$ 0.81 g | 0.0016 | 48 | 0.2 |
| P | Polybutadiene rubber having a cis-1,4 linkage content of 98% | — | — | — | 30 | 0.3* |
| Q | Polybutadiene rubber having a cis-1,4 linkage content of 98% | Ethyl glyoxylate 1.02 g | SnCl$_4$ 2.01 g | 0.0026 | 31 | 0.3 |
| R | Polybutadiene rubber having a cis-1,4 linkage content of 98% | Benzyl glyoxylate 1.64 g | BF$_3$O(C$_2$H$_5$)$_2$ 0.75 g | 0.0029 | 30 | 0.5 |
| S | Polybutadiene rubber having a cis-1,4 linkage content of 98% | Benzyl glyoxylate 1.64 g | TiCl$_4$ 1.90 g | 0.0020 | 33 | 0.3 |
| T | Polybutadiene rubber having a vinyl linkage content of 79% | — | — | — | 21 | 0.5* |
| U | Polybutadiene rubber having a vinyl linkage content of 79% | Benzyl glyoxylate 1.64 g | SnCl$_4$ 0.75 g | 0.0019 | 22 | 0.2 |
| V | Polybutadiene rubber having a vinyl linkage content of 79% | Benzyl glyoxylate 1.64 g | BF$_3$O(C$_2$H$_5$)$_2$ 0.33 g | 0.0015 | 22 | 0.3 |

*Each of the amounts of gel asterisked above was obtained with a rubber prepared by performing the same operation as in the preparation of the other except that the glyoxylate ester and the Lewis acid were not added, and is not the amount of gel originally contained in sample A, P or T (the gel which was originally contained in each of these samples mostly disappeared when it was dissolved in toluene).

EXAMPLE 6

One hundred and sixty (160) grams of polyisoprene rubber having a cis-1,4 linkage content of 98% (sample a) was dissolved in 3 liters of dehydrated toluene, and in a sealed glass vessel (separable flask), diethyl oxomalonate and SnCl$_4$ were added in the amounts shown in Table 10 to the solution at 25° C. in an atmosphere of nitrogen. The mixture was reacted for 30 minutes, and 100 ml of methanol was poured into the reaction mixture (whereby it was presumed the addition-reaction was stopped). Then, the reaction mixture was poured into 3 liters of methanol to coagulate the rubber completely. The coagulated product was cut to small pieces and washed. The small rubber pieces were immersed in 3 liters of methanol containing about 2 g of 2,6-ditertiary butyl-4-methylphenol (antioxidant), washed, and dried for a day in a vacuum dryer to give samples b, c, d and e shown in Table 10.

It is seen that the samples d and e in accordance with this invention were modified (introduction of the ester group) without substantial gellation or molecular weight reduction (change in Wallace plasticity).

TABLE 10

| Sample | Diethyl oxomalonate (g) | SnCl$_4$ (g) | Ester group introduced into rubber (moles/100 g of rubber) | Wallace plasticity | Amount of gel (%) |
|---|---|---|---|---|---|
| Comparison | | | | | |
| a | — | — | — | 48 | 0.6* |
| b | 1.0 | 0 | 0 | 48 | 0.2 |
| c | 0 | 1.7 | 0 | 47 | 0.4 |
| Invention | | | | | |
| d | 1.0 | 1.7 | 0.0019 | 48 | 0.5 |
| e | 2.8 | 4.8 | 0.0034 | 47 | 0.6 |

*This value was obtained with a rubber prepared by performing the same operation as in the prepartion of the other samples except that diethyl oxomalonate and SnCl$_4$ were not added to sample a, and is not the amount of gel originally contained in sample a (the gel which was originally contained in sample mostly disappeared when sample a was dissolved in toluene).

The properties of unvulcanized compound of the samples shown in Table 10 and their vulcanization products were measured, and the results are shown in Table 11.

TABLE 11

| | Properties of the unvulcanized compound | | | Properties of the vulcanized product | | | |
|---|---|---|---|---|---|---|---|
| | | | | Tensile test | | | |
| Sample | Wallace plasticity | Green strength (kg/cm$^2$) | Vulcanization speed T$_{95}$ (minutes) | Cure time (min.) | 300% Tensile stress (kg/cm$^2$) | Tensile strength (kg/cm$^2$) | Elongation (%) | Tear strength (kg/cm) |
| Comparison | | | | | | | | |
| a | 46 | 1.9 | 17 | 22 | 136 | 289 | 560 | 35 |
| b | 47 | 1.9 | 17.5 | 22 | 137 | 284 | 550 | 32 |
| c | 46 | 2.0 | 18 | 23 | 132 | 281 | 560 | 38 |
| Invention | | | | | | | | |
| d | 46 | 2.9 | 18 | 22 | 144 | 284 | 520 | 45 |
| e | 46 | 3.5 | 18 | 22 | 140 | 290 | 530 | 48 |

It is seen from Table 11 that the samples d and e of this invention particularly have excellent green strength and tear strength.

EXAMPLE 7

Polyisoprene rubber (sample a; 160 g) was dissolved in 3 liters of dehydrated toluene, and in a sealed glass vessel (separable flask), diethyl oxomalonate and SnCl$_4$ in the amounts indicated in Table 12 were added to the solution at 25° C. in an atmosphere of nitrogen. The mixture was reacted for 30 minutes, and 100 ml of methanol was poured into the reaction mixture (whereby it was presumed the addition-reaction was stopped). Then, ammonium cerium nitrate was added as an aqueous solution in each of the amounts shown in Table 12. The mixture was stirred for 1 hour. Then, the reaction mixture was poured into 3 liters of methanol to coagulate the rubber completely. The coagulated product was cut to small pieces and washed. The small rubber pieces were immersed in 3 liters of methanol containing about 2 g of 2,6-ditertiary butyl-4-methylphenol (antioxidant), washed and then dried for a day in a vacuum dryer. Thus, the modified polyisoprene rubber samples f and g shown in Table 12 were obtained.

TABLE 12

| Sample | Diethyl oxomalonate (g) | SnCl$_4$ (g) | Ammonium cerium nitrate (g) | Carboxyl group introduced into rubber (moles/100 g of rubber) |
|---|---|---|---|---|
| f | 1.0 | 1.7 | 7.7 | 0.0005 |
| g | 2.8 | 4.8 | 20.0 | 0.0009 |

The properties of unvulcanized compounds of samples f and g and their vulcanization products were measured, and the results are shown in Table 13.

TABLE 13

| | Properties of the unvulcanized compound | | | Properties of the vulcanized product | | | |
|---|---|---|---|---|---|---|---|
| | | | | Tensile test | | | |
| Sample | Wallace plasticity | Green strength (kg/cm$^2$) | Vulcanization speed T$_{95}$ (minutes) | Cure time (min.) | 300% Tensile stress (kg/cm$^2$) | Tensile strength (kg/cm$^2$) | Elongation (%) | Tear strength (kg/cm) |
| f | 45 | 3.6 | 18 | 23 | 138 | 285 | 530 | 54 |
| g | 42 | 4.2 | 18 | 23 | 139 | 293 | 540 | 55 |

A comparison of the results shown in Table 13 with those shown in Table 11 indicates that the samples f and g in accordance with this invention have higher green strength and tear strength than the unmodified polyisoprene rubber a and samples d and e of this invention (treatment with ammonium cerium nitrate was not performed).

EXAMPLE 8

Fifty grams of an unsaturated rubber (polyisoprene rubber having a cis-1,4 linkage content of 98% as sample h or polybutadiene rubber having a cis-1,4 linkage content of 98% as sample n) was dissolved in 1 liter of dehydrated toluene, and in a sealed glass vessel (separable flask), each of the oxomalonates and each of the Lewis acids indicated in Table 14 were added to the solution at 25° C. in an atmosphere of nitrogen. The mixture was reacted for 30 minutes, and 30 ml of methanol was poured into the reaction mixture. The reaction mixture was then poured into 1 liter of methanol to coagulate the rubber completely. The coagulated product was cut to small pieces and washed. Then, the small rubber pieces were immersed in 1 liter of methanol containing about 1 g of 2,6-ditertiary butyl-4-methylphenol (antioxidant), washed, and dried for a day in a vacuum dryer. Thus, samples i to m and o to q shown in Table 14 were obtained.

It is seen that the samples i to m and o to q in accordance with this invention were modified (introduction of the ester group) without substantial gellation or molecular weight reduction, and the method of this invention is an excellent method for modifying unsaturated rubbers.

TABLE 14

| Sample | Unsaturated rubber | Oxomalonate ester | Lewis acid | Ester group introduced into rubber (moles/100 g of rubber) | Wallace plasticity | Amount of gel (%) |
|---|---|---|---|---|---|---|
| h | Polyisoprene rubber | — | — | — | 48 | 0.6* |

TABLE 14-continued

| Sample | Unsaturated rubber | Oxomalonate ester | Lewis acid | Ester group introduced into rubber (moles/100 g of rubber) | Wallace plasticity | Amount of gel (%) |
|---|---|---|---|---|---|---|
| i | Polyisoprene rubber | Diethyl oxomalonate (1.4 g) | SbCl$_5$ (1.2 g) | 0.0038 | 48 | 0.3 |
| j | Polyisoprene rubber | Diethyl oxomalonate (1.4 g) | BF$_3$O(C$_2$H$_5$)$_2$ (0.5 g) | 0.0026 | 47 | 1.1 |
| k | Polyisoprene rubber | Diethyl oxomalonate (1.4 g) | SnCl$_4$ (1.0 g) | 0.0053 | 48 | 0.3 |
| l | Polyisoprene rubber | Diethyl oxomalonate (3.5 g) | SnCl$_4$ (2.6 g) | 0.0147 | 47 | 0.9 |
| m | Polyisoprene rubber | Diisopropyl oxomalonate (1.6 g) | SnCl$_4$ (1.0 g) | 0.0041 | 47 | 0.2 |
| n | Polybutadiene rubber | — | — | — | 30 | 0.3* |
| o | Polybutadiene rubber | Diethyl oxomalonate (1.4 g) | SnCl$_4$ (1.0 g) | 0.0027 | 30 | 0.1 |
| p | Polybutadiene rubber | Diethyl oxomalonate (1.4 g) | SbCl$_5$ (1.2 g) | 0.0019 | 31 | 0.5 |
| q | Polybutadiene rubber | Diisopropyl oxomalonate (1.6 g) | SnCl$_4$ (1.0 g) | 0.0017 | 31 | 0.2 |

*The amount of gel in sample h or n was obtained with a rubber prepared in the same way as in the preparation of the other samples except that the oxomalonate and the Lewis acid were not added to sample h or n, and is not the amount of gel originally contained in sample h or n (the gel contained originally in sample h or n mostly disappeared when it was dissolved in toluene).

EXAMPLE 9

Fifty grams of polyisoprene rubber having a cis-1,4 linkage content of 98% (sample h) was dissolved in 2 liters of dehydrated n-hexane, and in a sealed glass vessel (separable flask), each of the organic compounds and each of the Lewis acids indicated in Table 15 were added to the solution at 25° C. in an atmosphere of nitrogen. The mixture was reacted for 60 minutes, and then 30 ml of methanol was poured into the reaction mixture. Then, the reaction mixture was poured into 2 liters of acetone to coagulate the rubber completely. The coagulated product was cut to small pieces and washed. The small rubber pieces were immersed in 2 liters of methanol containing about 1 g of 2,6-ditertiary butyl-4-methylphenol (antioxidant), washed and dried for a day in a vacuum dryer. Thus, samples r to v were obtained.

A comparison of samples r to v in accordance with this invention with the unmodified sample h (see Table 14) shows that they were modified (introduction of the ester group) without substantial gellation or molecular weight reduction, and the method of this invention is an excellent method for modifying unsaturated rubbers.

TABLE 15

| Sample | Organic compound | Lewis acid | Wallace plasticity | Ester group introduced into rubber (moles/100 g of rubber) | Amount of gel (%) |
|---|---|---|---|---|---|
| r | t-Butyl oxoacetoacetate (1.2 g) | SnCl$_4$ (2.0 g) | 48 | 0.0113 | 0.3 |
| s | t-Butyl oxoacetoacetate (1.2 g) | BF$_3$O(C$_2$H$_5$)$_2$ (1.0 g) | 50 | 0.0090 | 0.4 |
| t | t-Butyl oxoacetoacetate (0.6 g) | TiCl$_4$ (0.7 g) | 51 | 0.0038 | 1.8 |
| u | t-Butyl oxocyanoacetate (1.1 g) | SnCl$_4$ (2.0 g) | 48 | 0.0074 | 0.8 |
| v | t-Butyl oxocyanoacetate (1.1 g) | BF$_3$O(C$_2$H$_5$)$_2$ (1.0 g) | 49 | 0.0069 | 1.0 |

What is claimed is:

1. A method for modifying a rubber, which comprises reacting a rubber having an unsaturated carbon bond with an organic compound represented by the general formula

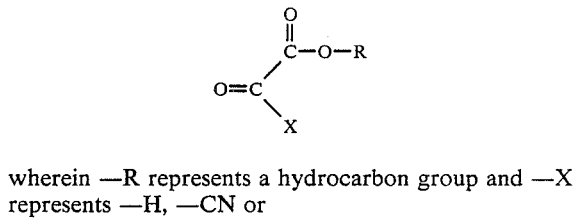

wherein —R represents a hydrocarbon group and —X represents —H, —CN or

in which Y represents —R$_1$, —OR$_2$ or —NR$_3$R$_4$, in which R$_1$, R$_2$, R$_3$ and R$_4$ are hydrocarbon groups, in the presence of a Lewis acid to introduce an ester group of the organic compound into the rubber by an addition reaction.

2. The method of claim 1 wherein the rubber having an unsaturated carbon bond is polyisoprene rubber.

3. The method of claim 1 wherein the Lewis acid is SnCl$_4$, BF$_3$O(C$_2$H$_5$)$_2$ or TiCl$_4$.

4. The method of claim 1 wherein —R in the general formula represents an aliphatic, alicyclic or aromatic hydrocarbon group.

5. The method of claim 1 wherein —X in the general formula is $$-\underset{\underset{O}{\|}}{C}-Y$$

6. A method for modifying a rubber, which comprises reacting a rubber having an unsaturated carbon bond with an organic compound represented by the general formula

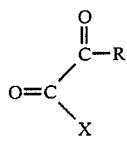

wherein —R represents a hydrocarbon group, and —X is —H, —CN or $$-\underset{\underset{O}{\|}}{C}-Y$$

in which —Y represents —R$_1$, —OR$_2$ or —NR$_3$R$_4$, in which R$_1$, R$_2$, R$_3$ and R$_4$ are hydrocarbon groups, in the presence of a Lewis acid to introduce an ester group of the organic compound into the rubber by an addition reaction, and thereafter converting the ester group either partly or wholly into a carboxyl group by chemical treatment.

7. The method of claim 6 wherein the rubber having an unsaturated carbon bond is polyisoprene rubber.

8. The method of claim 6 wherein the Lewis acid is SnCl$_4$, BF$_3$O(C$_2$H$_5$)$_2$, or TiCl$_4$.

9. The method of claim 6 wherein —R in the general formula is an aliphatic, alicyclic or aromatic hydrocarbon group.

10. The method of claim 6 wherein —X in the general formula is $$-\underset{\underset{O}{\|}}{C}-Y$$

11. The method of claim 6 wherein the chemical treatment is carried out in the presence of an acid, an alkali, or a radical generator.

12. The method of claim 1 wherein the rubber is reacted with 0.0001 to 20 parts by weight per 100 parts by weight of the unsaturated rubber of the organic compound.

13. The method of claim 1 wherein the addition reaction between the rubber and the organic compound is carried out in the presence of 0.01 to 5 moles, per mole of the organic compound, of the Lewis acid.

14. The method of claim 1 wherein the addition reaction is carried out in a solvent, or in the absence of a solvent in a kneader.

15. The method of claim 1 wherein the addition reaction is carried out at a temperature of from −20° C. to 100° C.

16. The method of claim 1 wherein the addition reaction is carried out for from 10 seconds to 10 hours.

17. The method of claim 1 wherein the rubber having an unsaturated carbon bond is selected from the group consisting of natural rubber, quayule gum, polyisoprene rubber, polybutadiene rubber, styrene-butadiene copolymer rubber, butadiene-isoprene copolymer rubber, isoprene-styrene copolymer rubber, butadiene-isoprene-styrene copolymer rubber, butadiene-piperylene copolymer rubber, butadiene-propylene alternate copolymer rubber, polypentenamer, ethylene propylenediene copolymer rubber, butyl rubber, butadiene-acrylonitrile copolymer rubber, butadiene-isoprene-acrylonitrile copolymer rubber, polychloroprene rubber, styrene-butadiene-styrene block copolymer rubber and styrene-isoprene-styrene block copolymer rubber.

18. The method of claim 1 in which —X is —H—.

19. The method of claim 18 wherein the organic compound is selected from the group consisting of methyl glyoxylate, ethyl glyoxylate, isopropyl glyoxylate, tertiary butyl glyoxylate, benzyl glyoxylate, phenyl glyoxylate, octyl glyoxylate and stearyl glyoxylate.

20. A method for introducing an ester group by an addition reaction into a rubber having an unsaturated carbon bond which comprises reacting 100 parts by weight of the unsaturated rubber with 0.0001 to 20 parts by weight of an organic compound represented by the general formula

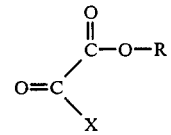

wherein —R represents an aliphatic, alicyclic or aromatic hydrocarbon group, and —X represents —H, —CN or $$-\underset{\underset{O}{\|}}{C}-Y$$

in which Y represents —R$_1$, —OR$_2$ or —NR$_3$R$_4$, in which R$_1$, R$_2$, R$_3$ and R$_4$ are hydrocarbon groups in the presence of 0.01 to 5 moles, per mole of the organic compound, of a Lewis acid selected from the group consisting of BF$_3$, BF$_3$O(C$_2$H$_5$)$_2$, (CH$_2$)$_2$BF, BCl$_3$, AlCl$_3$, AlBr$_3$, (C$_2$H$_5$)AlCl$_2$, POCl$_3$, TiCl$_4$, VCl$_4$, MoCl$_6$, SnCl$_4$, (CH$_3$)SnCl$_3$, SbCl$_5$, TeCl$_4$, TeBr$_4$, FeCl$_3$, WCl$_6$ and (CF$_3$COO)$_2$Hg at a temperature of from −20° C. to 100° C. for from 10 seconds to 10 hours.

21. The method of claim 20 wherein in the formula of the organic compound —X represents —H.

22. The method of claim 20 wherein the Lewis acid is SnCl$_4$, BF$_3$O(C$_2$H$_5$)$_2$ or TiCl$_4$.

23. The method of claim 20 which further comprises converting the ester group introduced into the rubber either partly or wholly into a carboxyl group by contacting the modified rubber with an acid, an alkali or a radical generator.

24. The method of claim 1 wherein the rubber is reacted with 0.01 to 5 parts by weight, per 100 parts by weight of the unsaturated rubber, of the organic compound.

25. The method of claim 6 wherein the rubber is reacted with 0.01 to 5 parts by weight, per 100 parts by weight of the unsaturated rubber, of the organic compound.

26. The method of claim 20 wherein the rubber is reacted with 0.01 to 5 parts by weight, per 100 parts by weight of the unsaturated rubber, of the organic compound.

27. The method of claim 1 wherein the organic compound is selected from the group consisting of methyl oxocyanoacetate, ethyl oxocyanoacetate and tertiary butyl oxocyanoacetate.

28. The method of claim 1 wherein the organic compound is selected from the group consisting of methyl oxoacetoacetate, butyl oxoacetoacetate, methyl oxobenzoylacetate, butyl oxobenzoylacetate, dimethyl oxomalonate, diethyl oxomalonate, diisopropyl oxomalonate, di-tertiary butyl oxomalonate, dibenzyl oxomalonate, ethyl 2,3-dioxo-3-(dimethylamino)propionate and methyl 2,3-dioxo-3-(diethylamino)propionate.

* * * * *